(12) United States Patent
Furuta et al.

(10) Patent No.: US 11,444,518 B2
(45) Date of Patent: Sep. 13, 2022

(54) MANUFACTURING METHOD AND MANUFACTURING DEVICE FOR ROTARY ELECTRIC MACHINE CORE

(71) Applicant: TOYOTA JIDOSHA KABUSHIKI KAISHA, Toyota (JP)

(72) Inventors: Kento Furuta, Toyota (JP); Yukinori Murakami, Toyota (JP); Yoshitada Yamagishi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 17/068,003

(22) Filed: Oct. 12, 2020

(65) Prior Publication Data
US 2021/0194337 A1 Jun. 24, 2021

(30) Foreign Application Priority Data
Dec. 19, 2019 (JP) .............................. JP2019-229397

(51) Int. Cl.
*H02K 15/02* (2006.01)
*H02K 1/28* (2006.01)
*H02K 1/18* (2006.01)

(52) U.S. Cl.
CPC ............. *H02K 15/02* (2013.01); *H02K 1/185* (2013.01); *H02K 1/28* (2013.01)

(58) Field of Classification Search
CPC ........... H02K 15/02; H02K 1/185; H02K 1/28
See application file for complete search history.

(56) References Cited

U.S. PATENT DOCUMENTS

| 3,926,320 A | * | 12/1975 | Shively | ................ B65G 59/026 414/796 |
| 5,982,074 A | * | 11/1999 | Smith | ....................... H02K 3/47 310/179 |
| 2013/0248100 A1 | * | 9/2013 | Peruzzi | ................... B32B 37/12 156/379.7 |

(Continued)

FOREIGN PATENT DOCUMENTS

CN 206756345 U * 12/2017
CN 107623413 A * 1/2018
(Continued)

*Primary Examiner* — Peter Dungba Vo
*Assistant Examiner* — Jose K Abraham
(74) *Attorney, Agent, or Firm* — Hunton Andrews Kurth LLP (57) ABSTRACT

A manufacturing method for a rotary electric machine core includes a lamination step in which a plurality of steel plates is laminated so that a laminated body is configured, a heating step in which the laminated body is heated to a specified target temperature, a pressurization step in which the laminated body is pressed by a pressurization member until a pressure load reaches a target load larger than a specified fastening load in a state where the laminated body is heated to the target temperature, the pressurization member is then made to stand still until the pressure load is constant, and, once the pressure load is constant, the pressurization member is moved away, and a fastening step in which, after the heating and the pressurization are stopped, the steel plates that configure the laminated body are fastened by a fastening part until the fastening load is generated.

4 Claims, 6 Drawing Sheets

(56) References Cited

U.S. PATENT DOCUMENTS

| | | | | |
|---|---|---|---|---|
| 2015/0314563 A1* | 11/2015 | Fluch | ................ | B32B 7/12 |
| | | | | 156/256 |
| 2016/0226323 A1* | 8/2016 | Piascik | ................ | H02K 15/02 |
| 2018/0166214 A1* | 6/2018 | Amano | ................ | B29C 70/84 |
| 2018/0233993 A1* | 8/2018 | Fukushima | ............ | H02K 1/185 |
| 2019/0089232 A1* | 3/2019 | Fukuyama | ............ | H02K 1/276 |

FOREIGN PATENT DOCUMENTS

| | | |
|---|---|---|
| JP | 2013-123301 A | 6/2013 |
| JP | 2013123301 A * | 6/2013 |

\* cited by examiner

MANUFACTURING METHOD AND MANUFACTURING DEVICE FOR ROTARY ELECTRIC MACHINE CORE

CROSS-REFERENCE TO RELATED APPLICATION

This application claims priority to Japanese Patent Application No. 2019-229397 filed on Dec. 19, 2019, incorporated herein by reference in its entirety.

BACKGROUND

1. Technical Field

This specification discloses a manufacturing method and a manufacturing device for a rotary electric machine core, the rotary electric machine core being a rotor core or a stator core.

2. Description of Related Art

A rotor core or a stator core for a rotary electric machine (hereinafter, referred to as a "rotary electric machine core") is often made by laminating a plurality of steel plates in an axis direction. In this case, each of the steel plates is made by covering a steel plate body with an insulating film. After the steel plates are laminated, they are firmly fastened to each other by fastening parts such as bolts and nuts.

It is desired that the rotary electric machine core described above maintains sufficient axial force so that the laminated steel plates are fastened to each other closely. Therefore, technologies used to ensure axial force of a rotary electric machine core have been proposed.

For example, a technique is disclosed in Japanese Unexamined Patent Application Publication No. 2013-123301 (JP 2013-123301 A). With this technique, fastening parts are attached to a laminated body of steel plates in a state where the laminated body is pressurized so as to be smaller than a fastening length of the fastening parts. Thereafter, pressurization is stopped, and the laminated body is restored so that the axial force is generated. With the technology, it is possible to ensure the fastening length of the fastening parts as designed. Therefore, a dimension of the laminated body in an axis direction is easily ensured as designed, and axial force is thus ensured to some extent.

SUMMARY

However, with the technique disclosed in JP 2013-123301 A, the laminated body is deformed elastically due to pressurization only. On the other hand, when the laminated body is used as a rotor core or a stator core, temperature of the laminated body gets high as the rotary electric machine is operated. When the high-temperature state continues, there are instances where an insulating film that covers each of steel plate bodies has creep deformation, and the axis-direction dimension of the entire laminated body is reduced. In this case, a fastening load applied by the fastening parts is reduced, and the axial force is also reduced.

Therefore, disclosed in this specification are a manufacturing method and a manufacturing device for a rotary electric machine core that is able to prevent reduction in the axial force effectively.

A manufacturing method for a rotary electric machine core disclosed in this specification is a manufacturing method for a rotary electric machine core that is a rotor core or a stator core. The manufacturing method includes a lamination step, a heating step, a pressurization step, and a fastening step. In the lamination step, a plurality of steel plates is laminated so that a laminated body is made. Each of the steel plates is made by covering a steel plate body with an insulating film. In the heating step, the laminated body is heated to a specified target temperature. In the pressurization step, in a state where the laminated body is heated to the target temperature, the laminated body is pressed by a pressurization member in a laminated direction until a pressure load reaches a target load that is larger than a specified fastening load. Then, the pressurization member is made to stand still until the pressure load is constant, and, once the pressure load is constant, the pressurization member is moved away from the laminated body so that the pressurization is stopped. In the fastening step, after the heating and the pressurization are stopped, the steel plates that configure the laminated body are fastened by a fastening part until the fastening load is generated.

As the laminated body is heated and pressurized before the fastening, creep deformation happens in the insulating film. Due to this, occurrence of creep deformation of the insulating film is restrained after the fastening. As a result, it is possible to effectively prevent a reduction in axial force of the rotary electric machine core.

In this case, the pressurization member may come into contact with and press an entire end surface of the laminated body in the laminated direction.

As the entire end surface of the laminated body in the laminated direction is pressed, it is possible to cause creep deformation in the entire insulating film. In other words, when the rotary electric machine is operated, it is possible to cause creep deformation in advance in the vicinity of a winding wire and the vicinity of a permanent magnet where temperature tends to increase particularly. Thus, it is possible to prevent creep deformation to a greater extent during the operation, and a decrease in the axial force of the rotary electric machine core is prevented more effectively.

Further, the target temperature may be temperature equal to or higher than temperature of the rotary electric machine core while the rotary electric machine is operated.

Thus, it is possible to prevent the creep deformation to a greater extent during the operation, and a decrease in the axial force of the rotary electric machine core is prevented more effectively. Temperature of the rotary electric machine core while the rotary electric machine is operated is, for example, saturation temperature of the rotary electric machine core in a case where the rotary electric machine continues to operate at a rated output, or temperature of the rotary electric machine core measured in accordance with a testing method specified in JISD1302 or the like.

A manufacturing device for a rotary electric machine core disclosed in this specification is a manufacturing device for the rotary electric machine core that is a rotor core or a stator core. The manufacturing device includes a pressurization mechanism, a heater, a pressure sensor, a temperature sensor, and a controller. The pressurization mechanism includes a base and a pressurization member that are arranged on both sides of a laminated body in a laminated direction, respectively. The laminated body is configured by laminating a plurality of steel plates, each of the steel plates being made by covering a steel plate body with an insulating film. The pressurization mechanism pressurizes the laminated body as at least the pressurization member is made to advance and retreat in the laminated direction of the laminated body. The heater heats the laminated body. The pressure sensor detects surface pressure as detected pressure, the surface pressure being received by the pressurization member from the laminated body. The temperature sensor detects temperature of the laminated body as detected temperature. The controller controls drive of the heater and the pressurization mechanism. The controller is configured to execute a heating treatment and a pressurization treatment in parallel. In the heating treatment, the heater is driven to heat the laminated body until the detected temperature reaches specified target temperature. In the pressurization treatment, the pressurization member is moved in a direction towards the laminated body until a pressure load reaches a target load that is larger than a specified fastening load. The pressure load is obtained as the detected pressure and a pressing surface area are multiplied. Then, the pressurization member is made to stand still until the pressure load is constant, and, once the pressure load is constant, the pressurization member is moved in a direction away from the laminated body.

As the laminated body is heated and pressurized with use of the manufacturing device for the rotary electric machine core, the creep deformation of the insulating film occurs. Then, after the fastening, occurrence of creep deformation of the insulating film is restrained. As a result, it is possible to prevent a decrease in the axial force of the rotary electric machine core effectively.

With the manufacturing method and the manufacturing device for the rotary electric machine core disclosed in this specification, it is possible to prevent a decrease in the axial force effectively.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
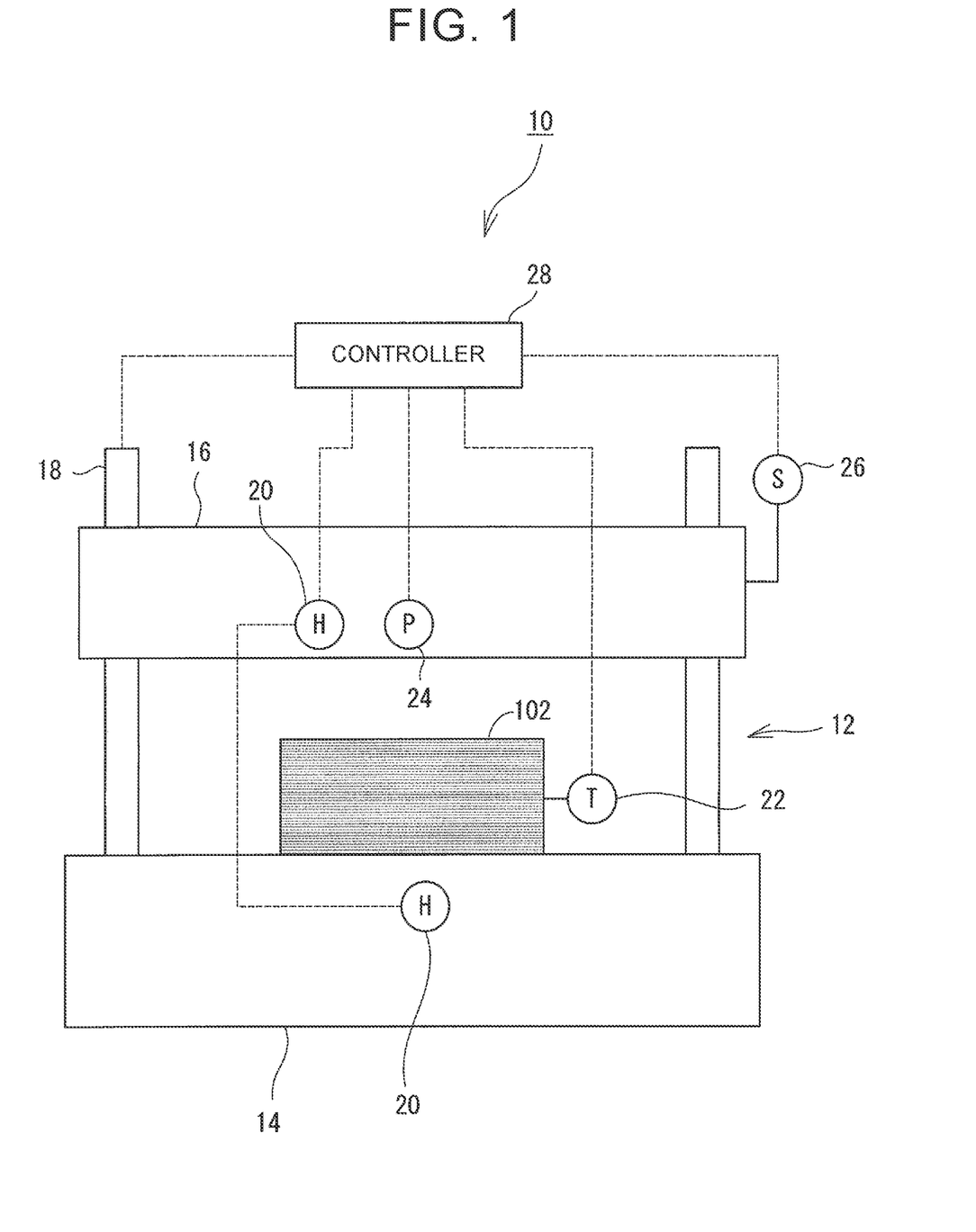
FIG. 1 is a schematic view of a configuration of a core manufacturing device.

Hereinafter, a manufacturing device and a manufacturing method for a rotary electric machine core 100 are described with reference to the drawings. FIG. 1 is a schematic view showing a configuration of a core manufacturing device 10. Prior to description of the core manufacturing device 10, the rotary electric machine core 100 is described with reference to FIG. 2 and FIG. 3.

Figure 2:
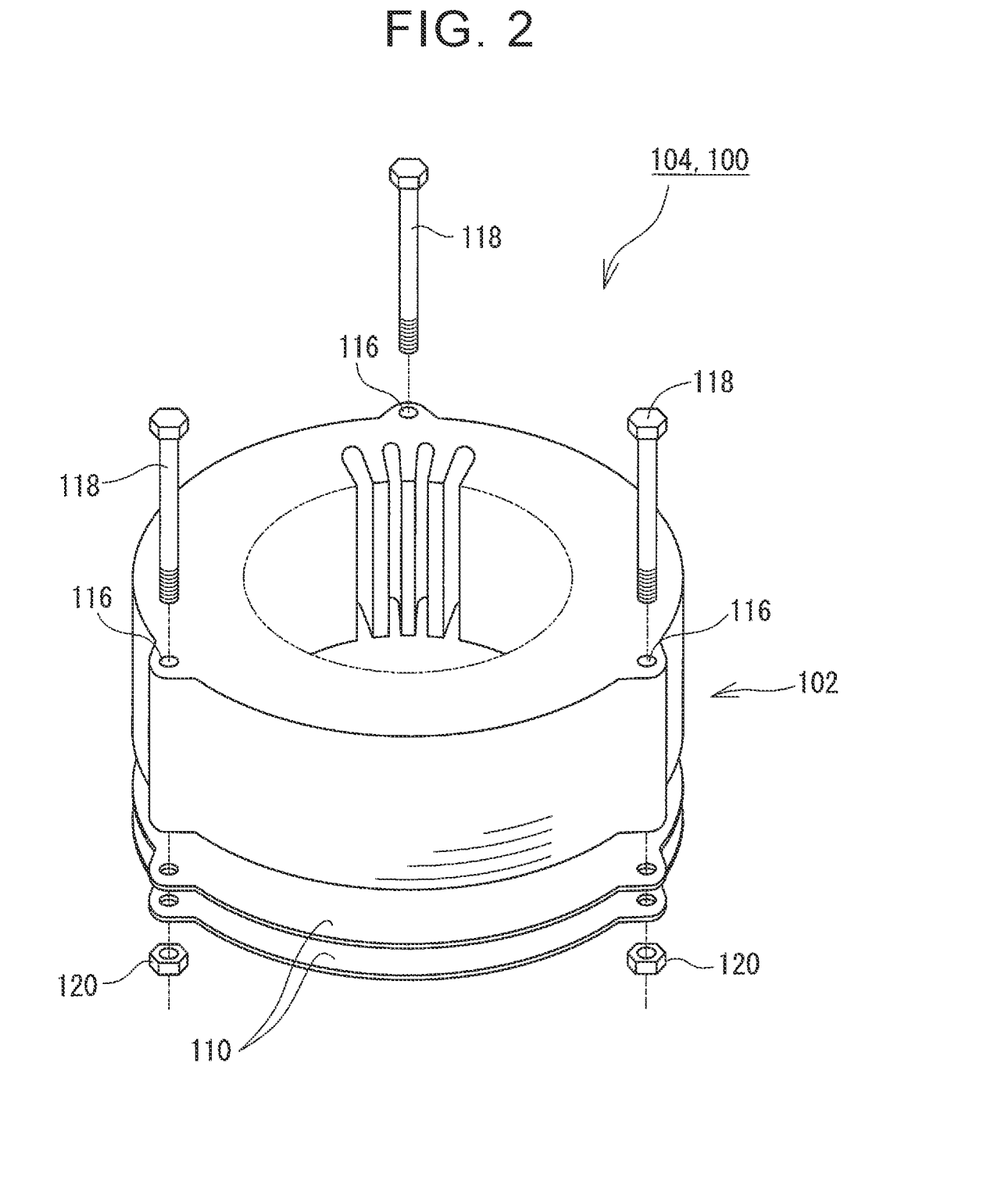
FIG. 2 is a schematic exploded perspective view of a stator core.
Figure 3:
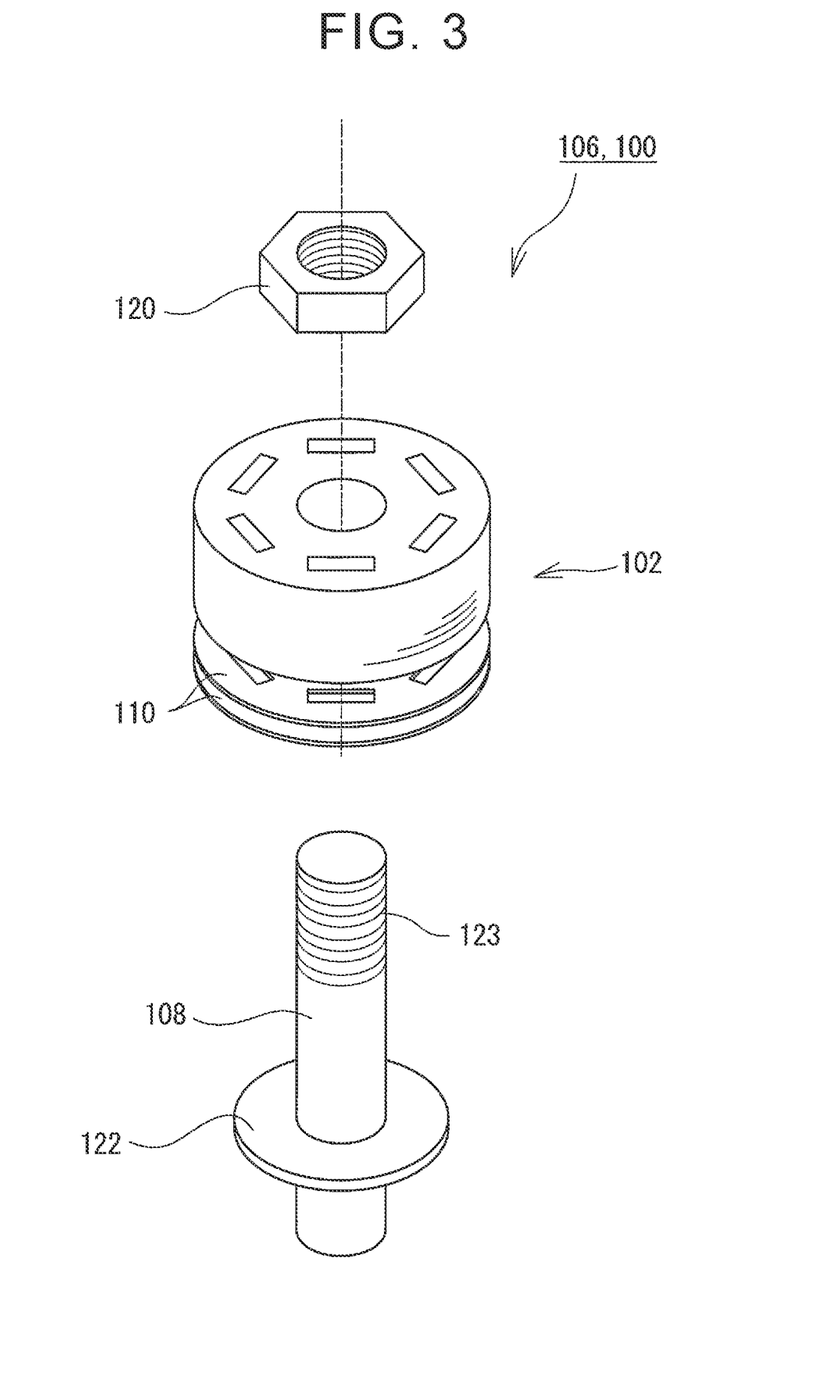
FIG. 3 is a schematic exploded perspective view of a rotor core.

The rotary electric machine core 100 is a core integrated in a rotary electric machine, and is a stator core 104 or a rotor core 106. FIG. 2 is a schematic exploded perspective view of the stator core 104, and FIG. 3 is a schematic exploded perspective view of the rotor core 106. Each of the stator core 104 and the rotor core 106 is configured by laminating a plurality of steel plates 110 in an axis direction. Hereinafter, the lamination of the steel plates 110 is referred to as a "laminated body 102".

The laminated steel plates 110 are fastened by fastening parts. For example, as shown in FIG. 2, the steel plates 110 that configure the stator core 104 may be fastened by fastening bolts 118 and fastening nuts 120 serving as the fastening parts. In this case, a plurality of (in the example in the drawing, three) fastening holes 116 is formed in the stator core 104, passing through the stator core 104 in the axis direction, and the fastening bolts 118 are inserted into the fastening holes 116, respectively. The steel plates 110 are sandwiched between heads of the fastening bolts 118, and the fastening nuts 120 that are screwed with the fastening bolts 118. Compression force in the axis direction in accordance with fastening force of the fastening nut 120, in other words, axial force, is applied to the steel plates 110.

Also, in the case of the rotor core 106, as shown in FIG. 3, a rotor shaft 108 inserted into the rotor core 106 may be used as the fastening part. In this case, a flange 122 having a diameter larger than that of a shaft hole of the rotor core 106 is formed in an intermediate part of the rotor shaft 108. Further, a male thread 123 with which the fastening nut 120 is screwed is formed in an outer peripheral surface of the rotor core 106. Once the rotor shaft 108 is inserted in the shaft hole of the rotor core 106, a first end surface of the rotor core 106 comes into contact with the flange 122, and the male thread 123 of the rotor shaft 108 projects from a second end surface of the rotor core 106. As the fastening nut 120 is screwed with the male thread 123, the steel plates 110 that configure the rotor core 106 are sandwiched between the flange 122 and the fastening nut 120. Then, compression force in the axis direction in accordance with fastening force of the fastening nut 120, in other words, axial force, is applied to the steel plates 110.

The rotary electric machine core 100 needs to keep the steel plates 110 in close contact with each other in order to maintain its performance. Then, in order for the rotary electric machine core 100 to keep the steel plates 110 in close contact with each other, it is required that sufficient axial force is continuously applied to the laminated body 102.

Therefore, there has been a proposal that a fastening load of the fastening parts is adjusted so that sufficient axial force is applied to the laminated body 102. However, in any of related arts, although sufficient axial force is obtained immediately after the laminated body 102 is fastened by the fastening parts, the axial force tends to decrease in an operation process of the rotary electric machine in which the rotary electric machine core 100 is incorporated.

Figure 4:
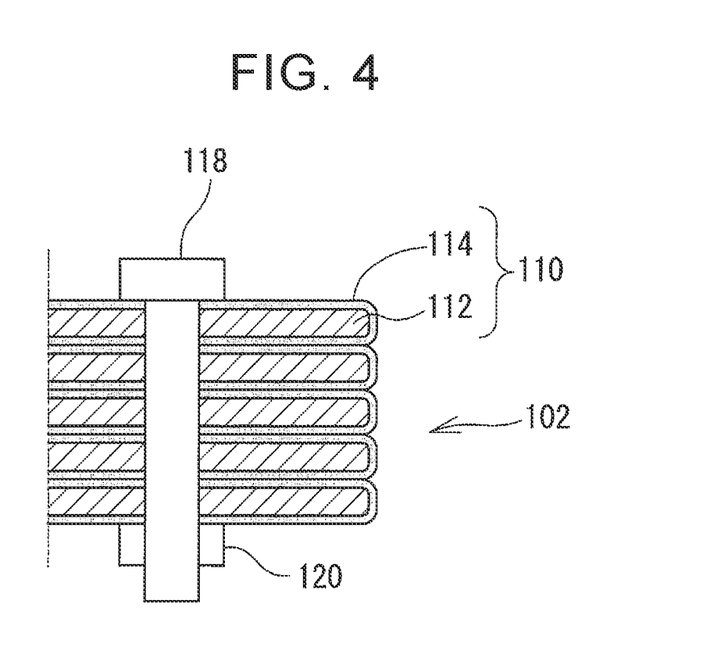
FIG. 4 is a schematic sectional view of a rotary electric machine core.
Figure 5:
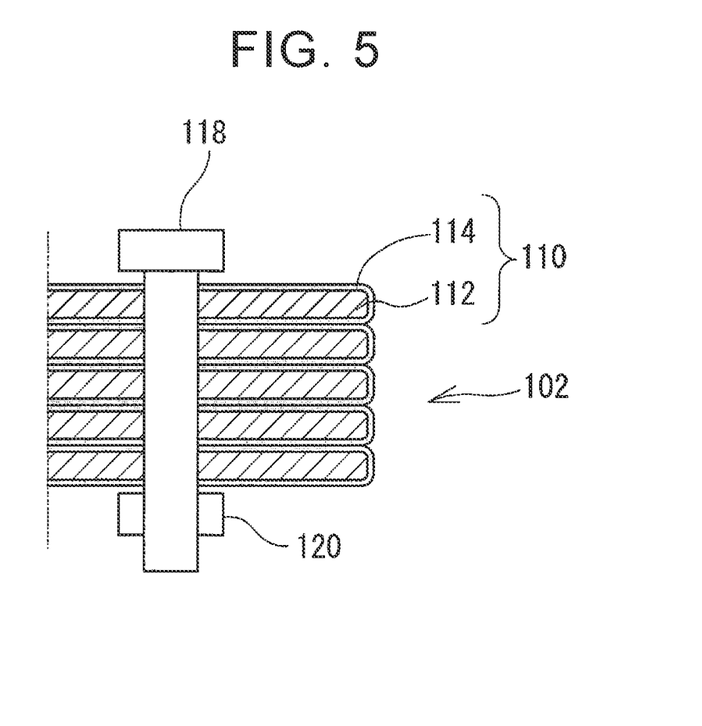
FIG. 5 is a schematic sectional view of a rotary electric machine core after creep deformation occurs.

This is described with reference to FIG. 4 and FIG. 5. FIG. 4 is a schematic sectional view of the rotary electric machine core 100. FIG. 5 is a schematic sectional view of the rotary electric machine core 100 after creep deformation occurs. As shown in FIG. 4, each of the steel plates 110 that configures the rotary electric machine core 100 includes a steel plate body 112 and an insulating film 114 that covers the steel plate body 112. The steel plate body 112 is a sheet metal made from, for example, a soft magnetic material. The insulating film 114 is a film made from insulating resin. As the fastening parts (the fastening bolt 118 and the fastening nut 120 in the example in the drawing) are fastened until the insulating film 114 is elastically compressed in a thickness direction, the axial force acts onto the laminated body 102.

There is no problem when the state shown in FIG. 4 is maintained. However, in reality, a dimension of the laminated body 102 in the axis direction is reduced due to thermal creep phenomenon, and axial force is thus reduced. This means that heat is generated in the stator core 104 or the rotor core 106 that is the rotary electric machine core 100 and its temperature increases as the rotary electric machine core 100 is driven. This means that pressure by the fastening parts and heat act on the rotary electric machine core 100 simultaneously. In this case, the insulating film 114 that is the resin material is deformed due to the thermal creep phenomenon and a thickness thereof is reduced. As a result, as shown in FIG. 5, while a fastening dimension of the fastening parts does not change, the dimension of the laminated body 102 in the axis direction gets smaller, and axial force acting on the laminated body 102 is reduced.

In this specification, in order to restrain a decrease in the axial force due to creep deformation, in a stage before the laminated body 102 is fastened by the fastening parts, creep deformation is proactively generated in the laminated body 102. A configuration of the core manufacturing device 10 that is used to manufacture the rotary electric machine core 100 is described with reference to FIG. 1.

The core manufacturing device 10 has a pressurization mechanism 12 that is used to pressurize the rotary electric machine core 100. The pressurization mechanism 12 includes a base 14, a pressurizing block 16, and a lifting mechanism 18. The base 14 is a member on which the laminated body 102 is placed before the fastening. The laminated body 102 is placed on the base 14 in such a posture that a laminated direction (that is the axis direction) of the laminated body 102 is orthogonal to a surface of the base 14. The base 14 may have any configuration as long as it is able to support the laminated body 102 stably. For example, in FIG. 1, a surface of the base 14 is a flat surface. However, when, for example, there are depressions and projections on an end surface of the laminated body 102, the surface of the base 14 may have depressions and projections that accommodate those depressions and projections. Further, the base 14 does not need to be made of a single member, and the base 14 may be made of a plurality of members. Therefore, for example, the base 14 may be made as a combination of a body portion, and an attachment that can be replaced in accordance with a type or a shape of the laminated body 102.

The pressurizing block 16 is a block member provided on an opposite side of the laminated body 102 from the base 14. The lifting mechanism 18 enables the pressurizing block 16 to advance and retreat in the laminated direction of the laminated body 102. The pressurizing block 16 may have any configuration as long as it is able to press the laminated body 102. For example, the pressurizing block 16 does not need to be made of a single member, and may be made of a plurality of members. Further, although a bottom surface of the pressurizing block 16 (that is a pressing surface that presses the laminated body 102) is a flat surface in FIG. 1, when, for example, there are depressions and projections in an end surface of the laminated body 102, the surface of the pressurizing block 16 may have depressions and projections that accommodate those depressions and projections. Further, an external shape of the pressurizing block 16 may be sufficiently larger than an external shape of the laminated body 102. With this configuration, the pressurizing block 16 is able to press an almost entire end surface of the laminated body 102.

The pressurizing block 16 is provided with a pressure sensor 24 that detects surface pressure that the pressurizing block 16 receives from the laminated body 102. A detection result of the pressure sensor 24 is input into a controller 28 as detected pressure. The controller 28 multiplies the detected pressure by an area of the pressing surface of the laminated body 102. The multiplication value is stored temporarily in a memory of the controller 28 as a pressure load F from the pressurizing block 16 onto the laminated body 102.

The lifting mechanism 18 lifts and lowers the pressurizing block 16. A configuration of the lifting mechanism 18 is not particularly limited. For example, the lifting mechanism 18 may include at least one of a motor, an air cylinder, a hydraulic cylinder, an electromagnetic cylinder, and a spring as a driving source. Further, the lifting mechanism 18 may also include a guide member that guides the pressurizing block 16 in its moving direction, a transmission member that transmits a power output from the driving source to the pressurizing block 16, and so on. Drive of the lifting mechanism 18 is controlled by the controller 28. Further, the lifting mechanism 18 is provided with a position sensor 26 (for example, an encoder or the like) that detects a position of the lifting mechanism 18 or the pressurizing block 16. A detection result from the position sensor 26 is input to the controller 28 as a detected position S.

The core manufacturing device 10 further includes a heater 20 that heats the laminated body 102 placed on the base 14. The heater 20 may have any configuration as long as it is able to heat the laminated body 102 to given target temperature T*. Therefore, the heater 20 may be, for example, an electromagnetic induction heater that generates heat in the laminated body 102 with electromagnetic induction, and a ceramic heater embedded in the base 14 or the like.

The core manufacturing device 10 is further provided with a temperature sensor 22 that detects temperature of the laminated body 102. The temperature sensor 22 may be a contact-type temperature sensor such as a thermistor, thermocouple, and so on. In this case, the temperature sensor 22 may be attached to the laminated body 102 and may directly detect temperature of the laminated body 102. Also, the temperature sensor 22 may be attached to the base 14 or the pressurizing block 16 and obtain temperature of the laminated body 102 indirectly from temperature of the base 14 or the pressurizing block 16. Further, the temperature sensor 22 may be a contactless temperature sensor 22 in which an infrared camera or the like is used. Temperature detected by the temperature sensor 22 is input to the controller 28 as detected temperature T.

Based on detection results from the various sensors 22, 24, 26, the controller 28 controls drive of the lifting mechanism 18 and the heater 20. The controller 28 is, for example, a computer having a processor and a memory. The "computer" includes a micro controller in which a computer system is integrated in a single integrated circuit. Further, a processor means a processor in a broad sense, and includes a versatile processor (for example, a central processing unit (CPU), and so on), and a dedicated processor (for example, a graphic processing unit (GPU), an application specific integrated circuit (ASIC), a field programmable gate array (FPGA), a programmable logic device, and so on). Further, processor operations described below may be performed not only by a single processor, but also by a plurality of processors that is physically distanced from each other but works together. Further, the order of the processor operations is not limited to the order described in each of the embodiments described above, and may be changed as necessary. Similarly, the memory does not need to be a physically single element, and may be configured by a plurality of memories that is physically distanced from each other. Further, the memory may include at least one of a semiconductor memory (for example, a RAM, a ROM, or a solid-state drive) and a magnetic disk (for example, a hard disk drive).

Figure 6:
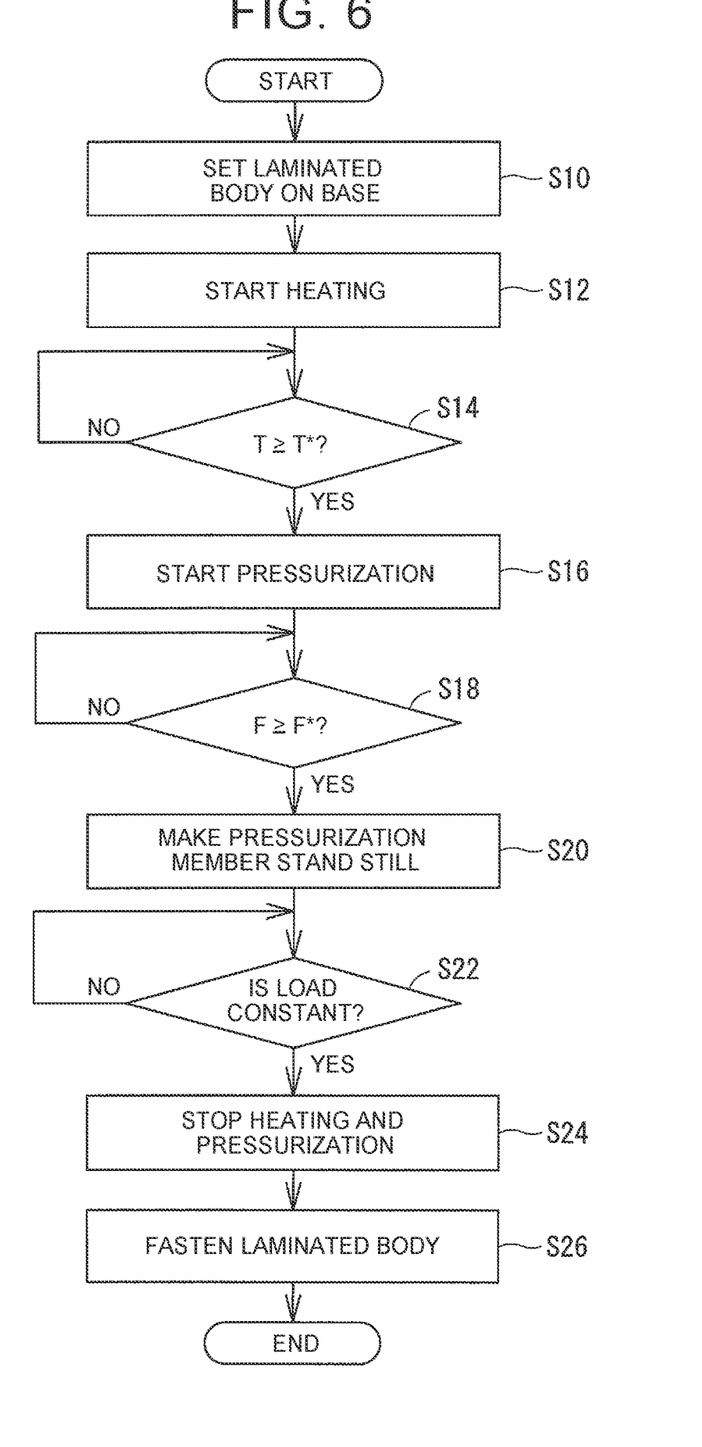
FIG. 6 is a flowchart showing a manufacturing flow for the rotary electric machine core.
Figure 7:
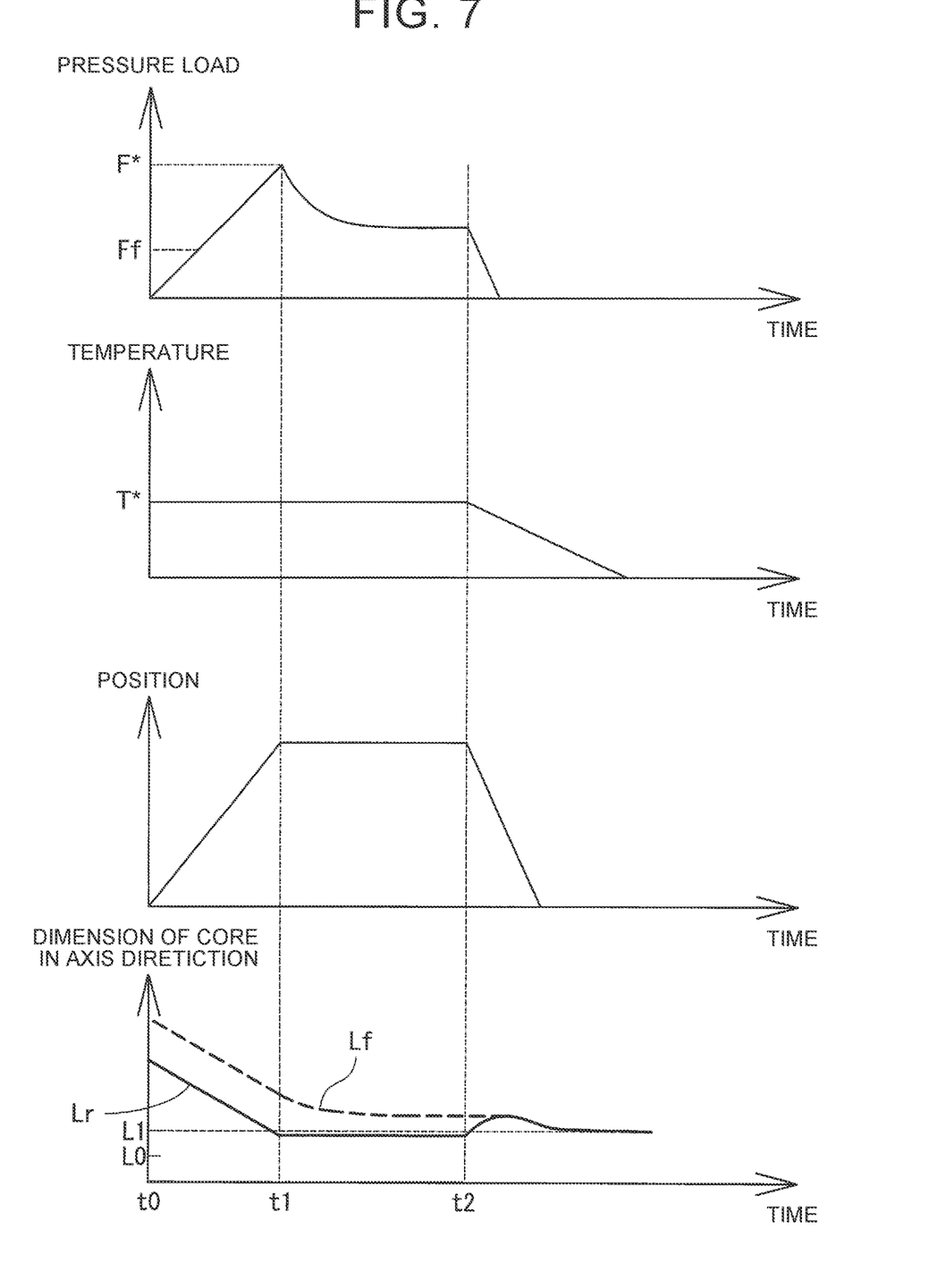
FIG. 7 is graphs that show changes over time of various parameters when a laminated body is heated and pressurized.

In this example, the core manufacturing device 10 is used to pressurize the laminated body 102 before being fastened while the laminated body 102 is heated so that creep deformation is encouraged to happen in the laminated body 102. Then, the laminated body 102 after the creep deformation is generated is fastened by the fastening parts. A flow of manufacturing of the rotary electric machine core 100 is described with reference to FIG. 6 and FIG. 7. FIG. 6 is a flowchart that shows a flow of manufacturing of the rotary electric machine core 100. FIG. 7 is graphs that show changes over time of various parameters when the laminated body 102 is heated and pressurized. In FIG. 7, the first graph from the top represents a pressure load F, the second graph from the top represents temperature of the laminated body 102 detected by the temperature sensor 22, the third graph from the top represents a position of the pressurizing block 16 detected by the position sensor 26, and the fourth graph from the top represents the dimension of the laminated body 102 in an axis direction.

When the rotary electric machine core 100 is manufactured, the laminated body 102 is configured in advance by laminating the steel plates 110 in the axis direction. The steel plates 110 that configure the laminated body 102 may be temporarily joined to each other by, for example, an adhesive, or crimping. In any case, the laminated body 102 is placed on the base 14 of the pressurization mechanism 12 before the laminated body 102 is fastened by the fastening parts (S10). Once this state is reached, the controller 28 heats and pressurizes the laminated body 102 in accordance with heating and pressurizing programs stored in the memory in advance (S12 to S24).

Specifically, first of all, the controller 28 drives the heater 20 so that the laminated body 102 is heated until the detected temperature T reaches the target temperature T* (S12, S14). Here, the target temperature T* is determined in advance, and its value is not particularly limited as long as the value is higher than temperature of an ambient environment. Therefore, the target temperature T* may be decided based on the temperature of the rotary electric machine core 100 while the rotary electric machine is operating. For example, when the rotary electric machine is continuously operated at constant rating, temperature of the rotary electric machine core 100 increases gradually and then saturates at constant temperature. The target temperature T* may be a value higher than the saturation temperature. Also, JISD1302 specifies a method for testing a maximum output of a rotary electric machine mounted on an electric vehicle. In compliance with this standard, the target temperature T* may be a value higher than the temperature of the rotary electric machine core 100 measured when the rotary electric machine is operated.

Once the temperature of the laminated body 102 reaches the target temperature T*, then the controller 28 moves the pressurizing block 16 towards the base and pressurizes the laminated body 102 until the pressure load F reaches a target load F* (S16, S18). The target load F* is determined in advance, and its value is not particularly limited as long as it is larger than a fastening load Ff by the fastening parts and also smaller than a breaking load of the insulating film 114. The pressurizing block 16 may be moved with use of force control where detected pressure is fed back so that the pressure load F changes in accordance with a given profile. Alternatively, the pressurizing block 16 may be moved with use of position control where a detected position is fed back so that the position of the pressurizing block 16 is changed in accordance with a given profile.

Time t0 in FIG. 7 represents timing at which the pressurizing block 16 comes into contact with the laminated body 102. In this example, as shown in the third graph from the top in FIG. 7, even after the pressurizing block 16 comes into contact with the laminated body 102, the pressurizing block 16 is made to advance. Thus, the pressure load F applied to the laminated body 102 by the pressurizing block 16 increases gradually.

Here, the fourth graph from the top in FIG. 7 represents the dimension of the laminated body 102 in the axis direction. The dimension in the axis direction includes an "actual dimension Lr" that is an actual dimension of the laminated body 102, and a "non-load dimension Lf" that is a dimension of the laminated body 102 in a state where pressurization of the laminated body 102 is stopped. Thus, the insulating film 114 of the steel plate 110 is gradually deformed in the compression direction as being pressurized in a heated condition, and the dimension of the laminated body 102 in the axis direction is reduced gradually. A deformation amount of the insulating film 114 includes an amount of elastic deformation and an amount of creep deformation. As a matter of course, the insulating film 114 is restored from its elastically deformed state in a non-load state after the pressurization is stopped. Meanwhile, the insulating film 114 is not restored from its creep-deformed state and the creep deformation remains even after the pressurization is stopped. The solid line in the fourth graph from the top in FIG. 7 represents the dimension of the actual laminated body 102 in the axis direction, that is the "actual dimension Lr". The broken line in the fourth graph from the top in FIG. 7 represents the "non-load dimension Lf" that is the dimension of the laminated body 102 in the axis direction in a state where pressurization of the laminated body 102 is stopped, in other words, a state where elastic deformation is restored. As shown in the fourth graph from the top in FIG. 7, as the pressure load F is gradually increased, both the actual dimension Lr and the non-load dimension Lf are reduced gradually.

Once the pressure load F reaches the target load F*, the controller 28 makes the pressurizing block 16 stand still at that spot (S20). Time t1 in FIG. 7 represents timing at which the pressurizing block 16 is made to stand still. As shown in the fourth graph from the top in FIG. 7, as the pressurizing block 16 is made to stand still, the actual dimension Lr is stabilized at a fixed value. On the other hand, even when the pressurizing block 16 is made to stand still, the creep deformation gradually progresses. Therefore, the non-load dimension Lf is decrease gradually even after the pressurizing block 16 is made to stand still. As a result, as shown in the first graph from the top in FIG. 7, the pressure load F decreases gradually even after the pressurizing block 16 is made to stand still.

However, the creep deformation does not progress endlessly, and stops at a certain point. Once the creep deformation stops progressing and the non-load dimension Lf is stabilized at a fixed value, the pressure load F is also stabilized at a fixed value.

The controller 28 monitors changes of the pressure load F, and keeps the pressurizing block 16 standing still until the pressure load F is stabilized at the fixed value (S20, S22). For example, the controller 28 may calculate a difference ΔF as necessary between a current pressure load F(t) and a pressure load F(t−n) before a given sampling, and determine that the pressure load F is constant once the difference ΔF reaches a specific permissible difference ΔFdef or below.

Once the pressure load F is constant, the controller 28 stops heating and pressurization of the laminated body 102 (S24). Time t2 in FIG. 7 represents timing at which heating and pressurization are stopped. As the pressurization is stopped, the insulating film 114 is restored from its elastically-deformed state, and the actual dimension Lr and the non-load dimension Lf fall into the same value. As the heating is stopped, the laminated body 102 is thermally contracted, and the actual dimension Lr and the non-load dimension Lf are decreased slightly. Then, eventually, the dimension of the laminated body 102 in the axis direction is stabilized at a fixed value L1.

Once the heating and pressurization of the laminated body 102 are stopped, the laminated body 102 is fastened by the fastening parts (S26) in the end. At this time, the fastening load Ff is smaller than the target load F*. Further, when the fastening happens, the insulating film 114 is elastically deformed, and therefore the actual dimension L0 of the laminated body 102 when it is fastened is smaller than the dimension L1 of the laminated body 102 in the axis direction when the heating and pressurization are stopped.

As evident from the description above, in this example, creep deformation of the laminated body 102 is made to happen as the laminated body 102 is heated and pressurized before the laminated body 102 is fastened by the fastening parts. As the creep deformation is made to happen in advance, the creep deformation is restrained after the fastening. As a result, a decrease in the axial force after the fastening is effectively restrained. In particular, when the rotary electric machine is operated, temperature tends to be high in the vicinity of teeth of the stator core 104 and in the vicinity of a magnet hole of the rotor core 106, and the creep deformation happens easily. In this example, the entire rotary electric machine core 100 including the vicinities of the teeth and the magnet hole is heated and pressurized in advance. As a result, the creep deformation happens in advance evenly in the entire rotary electric machine core 100 including the vicinities of the teeth and the magnet hole. This results in effective restraint of creep deformation after the fastening in the vicinities of the teeth and the magnet hole where temperature tends to get high. The configuration described here is an example only, and may be changed as appropriate as long as the laminated body 102 is heated and pressurized before the laminated body 102 is fastened in order to generate creep deformation.

What is claimed is:

1. A manufacturing method for a rotary electric machine core that is a rotor core or a stator core, the manufacturing method comprising:
    a lamination step in which a plurality of steel plates is laminated so that a laminated body is made, each of the steel plates being covered with an insulating film;
    a heating step in which the laminated body is heated to a specified target temperature;
    a pressurization step in which, in a state where the laminated body is heated to the target temperature, the laminated body is pressed by a pressurization member in a lamination direction until a pressure load reaches a target load that is higher than a specified fastening load, the pressurization member is then made to stand still until the pressure load is reduced and becomes constant as a value smaller than the target load, and, once the pressure load is constant, the pressurization member is moved away from the laminated body so that the pressurization is stopped; and
    a fastening step in which, after the heating and the pressurization are stopped, the steel plates that configure the laminated body are fastened by a fastening part until the fastening load is generated.

2. The manufacturing method according to claim 1, wherein the pressurization member comes into contact with and presses an entire end surface of the laminated body in the lamination direction.

3. The manufacturing method according to claim 1, wherein the target temperature is a temperature equal to or higher than the temperature of the rotary electric machine core while the rotary electric machine is operated.

4. A manufacturing device for a rotary electric machine core that is a rotor core or a stator core, the manufacturing device comprising:
    a pressurization mechanism that includes a base and a pressurization member arranged on both sides of a laminated body in a lamination direction, respectively, the laminated body being configured by laminating a plurality of steel plates, each of the steel plates being made by covering a steel plate body with an insulating film, the pressurization mechanism pressurizing the laminated body as at least the pressurization member is made to advance and retract in the lamination direction of the laminated body;
    a heater that heats the laminated body;
    a pressure sensor that detects surface pressure as detected pressure, the surface pressure being received by the pressurization member from the laminated body;
    a temperature sensor that detects temperature of the laminated body as detected temperature; and
    a controller that controls drive of the heater and the pressurization mechanism, wherein the controller is configured to execute in parallel:
        a heating mechanism in which the heater is driven to heat the laminated body until the detected temperature reaches specified target temperature; and
        a pressurization mechanism in which the pressurization member is moved in a direction towards the laminated body until a pressure load reaches a target load that is larger than a specified fastening load, the pressure load being obtained as the detected pressure and a pressing surface area, that is a contact area between the pressurization member and the laminated body, are multiplied, the pressurization member is then made to stand still until the pressure load is reduced and becomes constant as a value smaller than the target load, and, once the pressure load is constant, the pressurization member is moved in a direction away from the laminated body.

* * * * *